United States Patent [19]

Grundman

[11] 3,964,506

[45] June 22, 1976

[54] PRESSURE CONTROL SYSTEM

[75] Inventor: Richard G. Grundman, Coopersville, Mich.

[73] Assignee: General Motors Corporation, Detroit, Mich.

[22] Filed: May 2, 1973

[21] Appl. No.: 356,292

[52] U.S. Cl. .............................. 137/85; 192/109 F; 192/113 B
[51] Int. Cl.² ..................... H01M 4/36; F16D 25/00
[58] Field of Search .......... 137/85; 192/109 F, 85 R

[56] References Cited
UNITED STATES PATENTS

| | | | |
|---|---|---|---|
| 2,984,218 | 5/1961 | Christianson | 137/85 X |
| 3,561,367 | 2/1971 | Black | 192/109 F |
| 3,621,955 | 11/1971 | Black | 192/109 F |

*Primary Examiner*—Benjamin W. Wyche
*Attorney, Agent, or Firm*—Paul Fitzpatrick

[57] ABSTRACT

A system for controlling pressure of a fluid, specifically the pressure of servo oil delivered to a clutch which determines the torque transmitted by the clutch. The system includes a pump, a pressure regulating valve to provide servo oil at constant pressure from the pump, and a pilot valve controlled by a solenoid responsive to electric current to vary the pressure in a pilot fluid line supplied from the constant pressure line. The oil is delivered from the fixed pressure line to the clutch by a throttling flow control servo valve which can open for rapid filling of the clutch cylinder. This valve is biased to close by the delivered pressure and biased to open by the pilot pressure. It may also be biased to close by a spring, and in this case be restrained from completely closing, so that the valve assumes its minimum area when the delivered pressure is slightly less than the pilot pressure. The clutch supply line is connected to the pump inlet through a bypass servo valve which opens when the delivered pressure exceeds the pilot pressure, thus equalizing the delivered pressure with the pilot pressure. This valve also provides for rapid emptying of the clutch cylinder.

2 Claims, 8 Drawing Figures

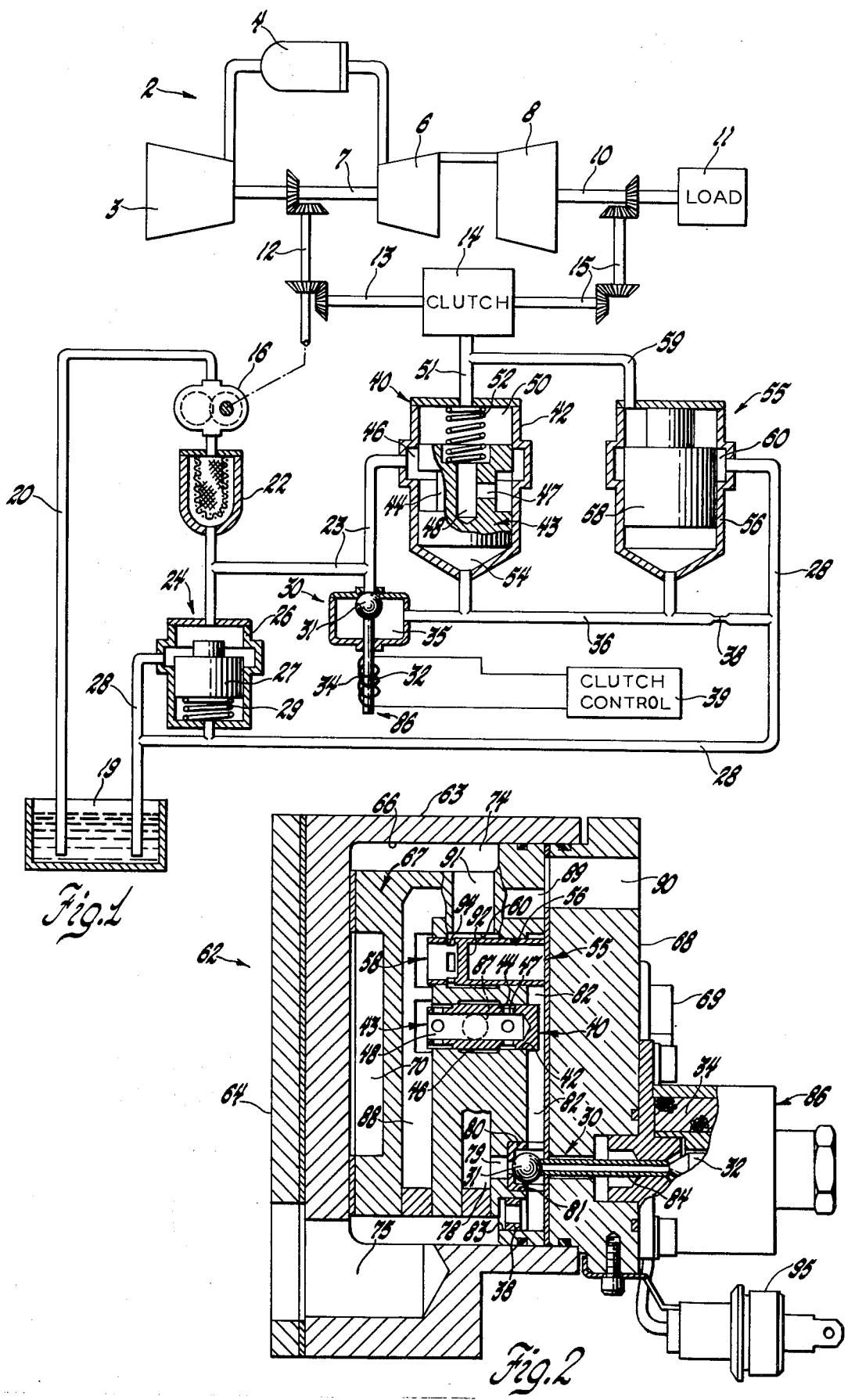

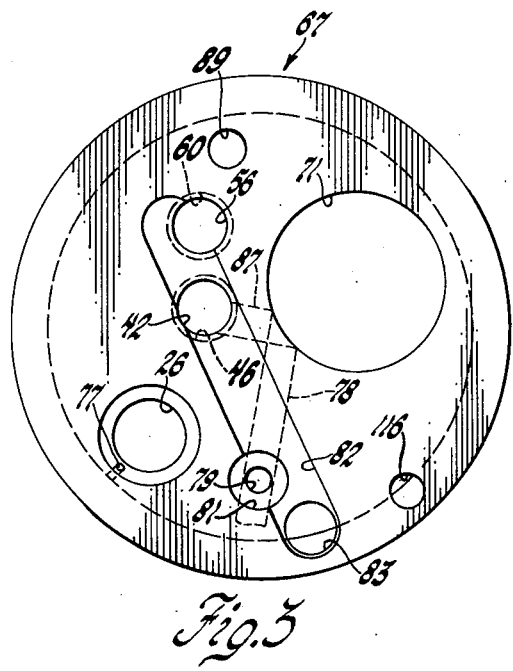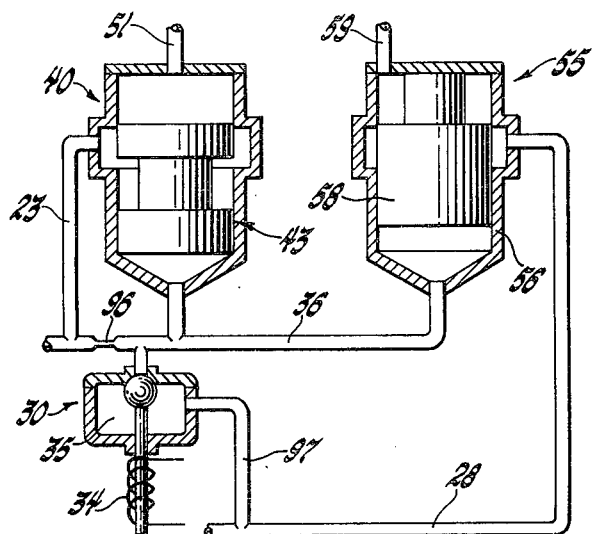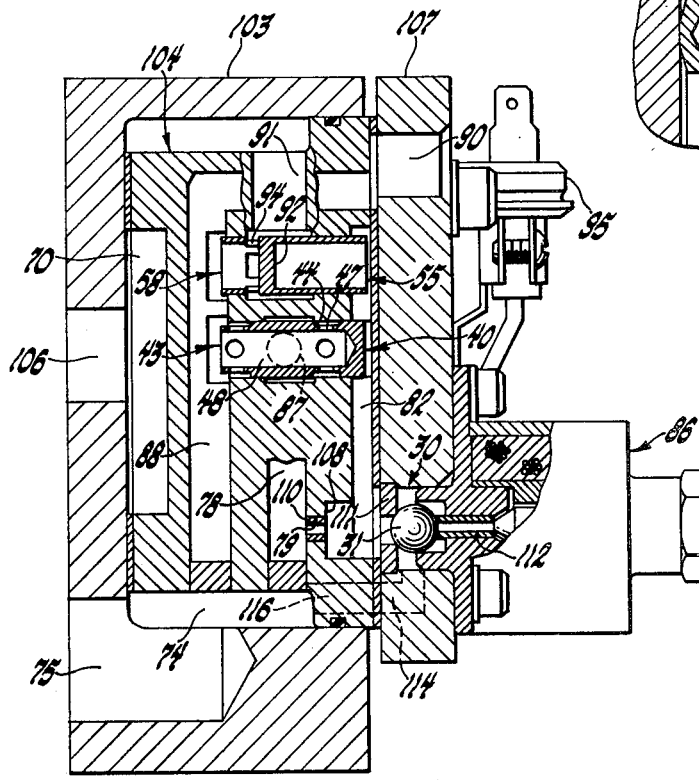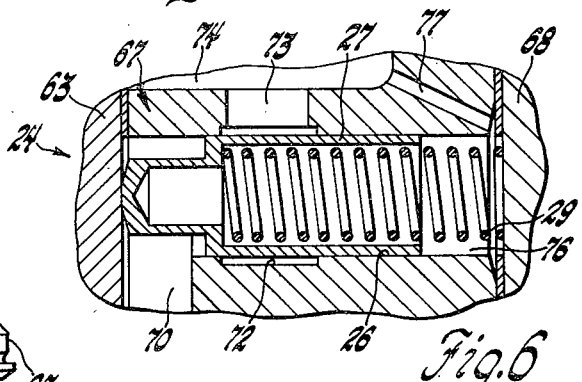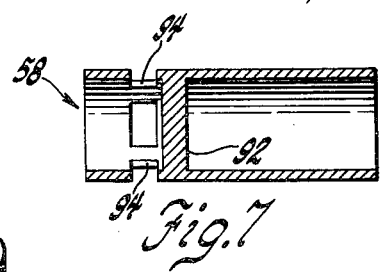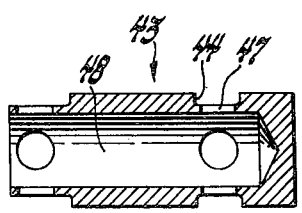

PRESSURE CONTROL SYSTEM

My invention is directed to a system for controlling the pressure of fluid in response to a signal and, in its preferred embodiment, to a system for controlling the pressure of oil supplied to engage and disengage a clutch in response to a varying electrical signal which provides an input of the desired clutch torque capacity. The system is such as to provide a relatively large flow of servo oil when needed to stroke the clutch, that is, fill or empty the clutch cylinder, and to provide a continuous smaller flow to provide for leakage or flow of cooling oil within the clutch; and to vary pressure with the clutch engaged to vary the transmitted torque.

In it preferred embodiment, the system includes as principal elements means for continuously supplying servo fluid at a fixed controlled pressure; a pilot valve which derives a variable pressure called the pilot pressure from the fixed pressure; a flow control valve which responds to the pressure of fluid delivered from the system and to the pilot fluid pressure to supply fluid to an outlet line at a high rate when needed and to supply fluid at a lower rate or shut off flow when the pressure delivered approaches or reaches the pilot fluid pressure; and a by-pass valve which bleeds fluid from the outlet line to hold its pressure balanced with the pilot pressure and to drain the clutch cylinder for full clutch disengagement.

The system is particularly intended and adapted for use to control a power transfer clutch in a gas turbine engine, but may have other applications to control fluid pressure.

The principal objects of my invention are to provide a simple, reliable, and practicable system for controlling pressure of fluid delivered to a controlled device and to provide improved means for controlling a clutch in response to the magnitude of an electrical signal.

A further object is to provide such a system including a first valve for supplying fluid to a user at a variable rate and a second valve for venting fluid from the user, with both valves responsive to a desired pressure signal and to the pressure of fluid at the user.

The nature of the invention and its advantages will be clear to those skilled in the art from the succeeding detailed description of preferred embodiments of the invention and the accompanying drawings.

FIG. 1 is a schematic diagram of a gas turbine engine with a clutch control system according to one embodiment of the invention.

FIG. 2 is a sectional view of a valve assembly substantially as employed in FIG. 1.

FIG. 3 is a much reduced front view of a valve body employed in the assembly of FIG. 2.

FIG. 4 is a partial schematic diagram illustrating another embodiment of the invention.

FIG. 5 is a sectional view similar to FIG. 2 illustrating an embodiment of the valve assembly for use in the system of FIG. 4.

FIG. 6 is a longitudinal sectional view of the pressure limiting relief valve.

FIG. 7 is a longitudinal sectional view of the by-pass valve spool.

FIG. 8 is a longitudinal sectional view on the flow control valve spool.

Referring first to FIG. 1, a gas turbine engine 2 comprises a compressor 3, combustion apparatus 4 supplied by the compressor, and a gas generator turbine 6 supplied with motive fluid by the combustion apparatus. The gas generator turbine drives the compressor through a shaft 7. The exhaust from the turbine powers a load turbine 8 connected through a shaft 10 to a load 11 which may include any suitable power transmission devices such as clutches, torque converters, gear boxes, and the like, and may include, for example, the driving wheels of a motor vehicle. Shaft 7 is connected through shaft 12 and gearing to input shaft 13 of a power transfer clutch 14. The other input to clutch 14 is through shafting and gearing 15 from the power output shaft 10.

The engine as described is of a known type and the clutch 14 may be a known type of friction clutch, the plates of which are engaged by a hydraulic cylinder or motor so that engaging force and torque capacity are proportional to the pressure of fluid within the cylinder.

This sort of power plant, particularly the power transfer clutch, is described in Flanigan et al U.S. Pat. No. 3,327,404 issued Mar. 1, 1966.

An engine of this nature is also described in Collman et al U.S. Pat. No. 3,267,674 issued Aug. 23, 1966. The patents illustrate engines including regenerators, which may or may not be included in the engine 2.

The purpose of the power transfer clutch, as pointed out clearly in the Flanigan et al patent, is to take power from turbine 6 and deliver it to the output shaft 10 at lower load conditions of the engine so as to maintain a relatively high turbine inlet temperature in the gas generator and thus benefit engine economy. It has other functions, including transfer of power from the load shaft to the compressor 3 for power turbine speed limiting and vehicle braking. These need not be enlarged upon here.

With modern development of electronic control systems incorporating solid state electronic devices, there is a trend for a great part of the control of such engines to be taken over by such electronic systems. If electronic engine controls are employed, an electrical signal from such controls is used to control the torque of the power transfer clutch.

My invention provides a hydraulic system suitable for supplying and withdrawing fluid at desired rates for such purposes and effective to control the clutch-engaging pressure accurately in response to an electrical signal which may be generated by any appropriate electric or electronic control system. The details of electronic control systems as such are not material to my invention.

Referring again to FIG. 1, the shaft 12 drives a servo oil pump 16 which may also be a lubricating oil pump. This pump draws oil from a sump 19 through a line 20 and delivers it through a filter 22 to a constant pressure servo oil line 23. It will be understood that any suitable servo fluid may be employed, but the fluid will be referred to hereafter as oil. The pressure in line 23 is maintained constant by a pressure regulating valve 24 of a relief valve type, which may be of conventional structure. As illustrated, the valve includes a cylinder 26 within which a piston 27 is reciprocable to regulate an outlet into a return line 28 leading to the sump 19. Piston 27 is biased to shut off flow of fluid by a compression spring 29 and is biased to open by the pressure in the line 23. The space below piston 27 is vented to return line 28 and is thus at atmospheric pressure.

Constant pressure line 23 has a branch which enters a pilot valve 30 which includes a ball 31 pushed against a seat into which line 23 enters by an armature 32 pulled by a solenoid 34. Flow past ball 31 enters a chamber 35 in the pilot valve which supplies a pilot fluid line 36. Line 36 is connected through a restriction or orifice 38 to the return line 28. Since pressure in line 36 biases ball 31 towards the seat and pressure in line 23 biases it away from the seat, the difference between these pressures may be determined by the force exerted on the ball by armature 32, and thus by the energization of solenoid 34. The armature and solenoid, and also the pilot valve, may be of the type illustrated in Deckard U.S. Pat. No. 3,805,203 or any other suitable such device. Of course, if required by any control system, the valve ball 31 could be biased by an external force generated some other way.

The force exerted by the solenoid is determined by the modulation of a current to the solenoid, this modulation being effected by a clutch control 39, the specific nature of which is immaterial to my invention. So far as my invention is concerned, the clutch control might be simply a rheostat or potentiometer controlling the flow of current to the solenoid 34. In practice, however, more sophisticated controls are employed, and ordinarily it is preferred that the control be of the duty cycle type in which the effect of the current is the result of the length of time during successive cycles that a constant current is turned on as against the time it is turned off.

The gauge pressure in chamber 35 is a function of the flow through orifice 38 and, for any given amount of excitation, the pilot valve opens until the seating effect of the pressure in chamber 35 plus the seating effect of the armature 32 equals the unseating effect of the constant pressure supplied to the pilot valve.

Servo oil to engage the clutch is supplied from line 23 to the clutch through a flow control servo valve 40 which will be referred to as the flow control valve. Valve 40 comprises a valve cylinder 42 in which a spool 43 is reciprocable. Spool 43 has two lands at the ends of the spool and a circumferential recess 44 which may overlap to some extent a recess 46 in the valve body into which line 23 enters. Recess 44 communicates through radial ports 47 with a bore 48 in the valve spool which discharges into chamber 50 of the valve which in turn is connected through an output line 51 to the clutch 14 to supply the clutch-engaging servo oil. Spool 43 as shown here in biased to the minimum opening position shown, in which it restricts flow to the clutch, by a light compression spring 52 and by the pressure in chamber 50. It is biased to open the valve by pressure in a chamber 54 connected to the pilot fluid line 36. The areas of the two ends of the spool are the same. The valve opens when pressure in 54 exceeds that in chamber 50 by an amount greater than the force per unit spool area exerted by spring 52. When the delivered pressure is slightly less than the pilot pressure, spring 52 closes the valve to the position indicated so that flow into line 51 is limited at the annular gap between the valve spool and the wall of recess 46. High flow to the clutch may serve to fill the clutch-engaging cylinder to engage the clutch. Smaller flow thereafter serves to take care of cooling oil for the clutch and any leakage in the system.

Alternatively, the spring 52 may be omitted, and valve 40 be capable of closing completely, in which case it closes when the pressure of the delivered fluid just exceeds pilot pressure, and opens when pilot pressure just exceeds delivered pressure.

The clutch is vented to the sump, and the exact pressure on the clutch may be determined, by the by-pass servo valve 55, hereinafter called the by-pass valve, which includes a body defining a cylinder 56 and a reciprocable valve piston 58. Clutch line 51 is connected through a conduit 59 with the space above piston 58 as illustrated and pilot pressure line 36 is connected to the space below the piston. Thus the net force effective to move the piston in the cylinder is the result of the difference in pressure between line 51 and line 36. When the pressure in line 51 exceeds that in line 36, the spool is moved downwardly as illustrated from its closed position to open flow from line 59 into a recess 60 in the wall of valve cylinder 55. Recess 60 communicates with the return or drain line 28. Thus, by diverting some fluid from the clutch, the servo valve maintains the pressure in the clutch equal to that in the pilot line 36 in the system including spring 52 in the flow control valve.

If, for example, the current supplied to solenoid 34 drops from maximum to zero, the pressure in line 36 rises to equal that in line 23 and the flow control valve will be open fully for long enough to fill the clutch cylinder, after which it will move to its minimum flow position. The pressure in the clutch rises further until it balances the pressure in line 36 and overflow takes place through the by-pass valve. If there is no spring 52, valves 40 and 55 balance when clutch pressure equals pilot pressure. Valve 40 supplies the clutch and any outflow through valve 55.

With this system, the clutch actuating pressure is reversely related to current; that is, with zero current there is maximum servo oil pressure and this pressure decreases until, at some definite value of effective current in solenoid 34, the pilot valve 30 is held shut against the pressure in line 23, the pilot pressure becomes zero, and therefore the clutch pressure becomes zero.

Spring 52 was originally considered to be desirable to stabilize the valve system. However, experience with a particular engine control has shown better response to transients with spring bias omitted from valve 40. It may be desirable to include the spring in other systems, however.

FIGS. 2, 3, 6, 7, and 8 show a structural arrangement of a valve assembly of a control as diagrammed in FIG. 1. As far as feasible, parts shown in FIG. 2 are numbered as in FIG. 1. These figures illustrate an assembly without the bias spring 52.

A valve assembly 62 comprises a main housing 63 and a rear cover plate or adapter 64. The housing 63 defines a cylindrical cavity 66 within which is mounted a valve body 67 (see also FIG. 3) of circular cross-section which seats through a gasket against the rear wall of housing 63. A circular front cover 68 also seated within the cavity 66 abuts the valve body 67 through a suitable gasket and thus retains the valve body. 0-rings mounted in the wall of the valve body and front cover seal against the housing 63. The front cover 36 and rear cover 64 are suitably bolted to the housing 63.

Oil delivered by the pump, which is not included in the assembly of FIG. 2, enters the assembly through a fitting 69 in front cover 68 and flows through the filter 22 into a chamber 70 defined by a recess in the valve body 67 and housing 63. The filter is a cylindrical filter with radially outward flow mounted in a chamber defined by a bore 71 (FIG. 3) extending from face to face of the valve body. The filter is not illustrated, as details are immaterial. The filter may be structurally similar to the high pressure filter of my copending application for Flow Control System Serial No. 356,291 filed May 2, 1973. The filter is mounted in bore 71 between fitting 69 and the rear wall of housing 63.

As shown in FIG. 6, chamber 70 intersects cylinder 26 in the valve body 67 in which the pressure regulating valve piston 27 is reciprocable. The piston is urged to its seated or valve closed position by the compression spring 29 which bears against the front cover 68. Pressure in chamber 70 tends to lift the valve to allow flow into a recess 72 which communicates through a passage 73 with an annular sump or oil return space 74 between the valve body 67 and housing 63. This is intersected by a port 75 to which the return line 28 is connected. The space 76 behind the valve piston 27 is vented to the annular sump 74 through a passage 77. The valve piston 27 thus maintains a constant pressure in chamber 70 which corresponds to the line 23 in FIG. 1.

Oil flows from chamber 71 through a drilled transverse passage 78, the outer end of which is closed off from space 74 by a plug, and through a connecting passage 79 to the pilot valve 30. Ball 31 of the valve engages a seat provided by a cup 80 pressed into a recess 81 in the end of passage 79. The downstream side of the valve communicates with a passage defined by a slot 82 milled in the front surface of valve body 67. This slot communicates through a bore 83 with space 74 connected to the return line. A restrictor 38 is fixed in bore 83. Slot 82 thus corresponds generally to the pilot oil pressure line 36 of FIG. 1. Ball 31 is urged against the seat by a rod 84 on which force is exerted by the armature 32 of the solenoid assembly 86 under the action of the solenoid 34.

The constant supply pressure regulated by the pressure regulating valve 24 is tapped from the exterior of the filter by a port 87 which enters the recess 46 of cylinder bore 42 of the flow control valve 40. The spool 43 of this valve (shown also in FIG. 8) may be biased towards the front of the valve body by the compression spring 52 mounted in bore 48 of the valve spool if desired; however, as shown here, the spring is omitted. Cylinder 42 intersects a passage 88 extending across the valve body 67 connecting with a passage 89 which is in communication with an outlet port 90 in the front cover 68. This outlet port receives the line 51 leading to the clutch. Valve spool 43 controls flow from the port 87 into passage 88 as previously described. It is biased to close by pressure in passage 88 and to open by pressure of pilot oil in passage 82. When the annular recess 44 of valve spool 43 registers with the recess 46 in the cylinder, the servo oil can flow through the port 47 in the valve spool and through the central passage 48 to the outlet 90.

By-pass valve 55 is mounted adjacent and parallel to the valve 40 in the cylinder 56. The passage 82 communicates with the forward end of this cylinder; a bore 91 connects the intermediate recess 60 of this cylinder with the return annulus 74. The rear end of cylinder 56 intersects the passage 88 leading to the outlet at 90. The piston 58 of the valve (see also FIG. 7) is freely slidable in the cylinder 56. It has a transverse web 92 which is biased in one direction by the outlet pressure and in the other by the pilot pressure. Radial ports 94 in the valve spool may register with the recess 60 or move out of register with the recess. By-pass flow is from passage 88 through the ports 94, recess 60, and bore 91 to the return line.

Connector 95 is an electrical connector for the solenoid 34.

Proceeding to the second embodiment of the system, this is very much like the form of FIG. 1 except that the pilot pressure increases with current rather than decreases. In this case, if there should be a failure of the electrical system deenergizing solenoid 34, the pilot pressure will drop to substantially zero and, therefore, the clutch will be disengaged.

FIG. 4 shows enough of this system to illustrate the different arrangement of the components. Those not shown on FIG. 4 may remain the same in structure and interconnection as in FIG. 1. The basic difference is that the pilot pressure line 36 is connected to the constant pressure line 23 through an orifice 96 and is connected to the return line 28 through the pilot valve 30. Pilot valve 30 is nonrestrictedly connected to the return line through line 97. With valve 30 closed, the pilot pressure in line 36 will rise to the value of the constant pressure in line 23. As the force holding valve 30 is decreased, there is some leakage through the valve to the return line and the resulting pressure drop in orifice 96 causes a decrease in the pilot pressure in line 36 which controls the valves 40 and 55. Pilot pressure is thus responsive to the energization of solenoid 34. FIG. 4 illustrates valve 40 without the biasing spring; however, it may be included as shown in FIG. 1.

FIG. 5 illustrates the structure of a valve assembly in accordance with the system illustrated in FIG. 4. In the main, the components are the same and are located the same as in FIGS. 2 and 3. For this reason only a few of the components are identified and those corresponding exactly to those shown in FIG. 2 are not identified in detail. The main housing 103 and the valve body 104 are much the same as parts 63 and 67 of FIG. 2. FIG. 5 illustrates an inlet from the pump at 106 into chamber 70. It leads into the filter from the rear side of the assembly rather than the front side. However, the front face entrance previously described into the filter chamber may be used if desired. The front cover 107 is different from cover 68 of the prior described from also because of provision to include the pilot valve 30 in the cover. Passage 88 and port 90 communicate with the actuated device as before. Pilot pressure is maintained in the slot 82 in the forward face of the valve body 104 to actuate the flow control valve 40 and by-pass valve 55 which are the same as previously described. Filtered fuel is discharged through port 87 into valve 40 and into passage 78 leading to the pilot valve 30. The recess 108 in the front face of the valve body 104 is a carry-over from the other form in which it provides for mounting the pilot valve.

In this form of the device, a sleeve 110 fixed in passage 79 defines an orifice leading from the constant pressure supply line 78 to the recess 108 and slot 82 which contain fuel at pilot pressure under the action of valve 30.

Valve 30 includes the ball 31 and an annular seat 111 and is biased through a short pushrod 112 by the solenoid device 86. The passage 83 through the flange of the valve body is blocked by cover 107. The discharge side of pilot valve 30 drains through a passage 114 in the front cover 107 and a hole 116 in the body 104 into the low pressure area at 74. The same machined valve body may be used in either form, the difference between bodies 67 and 104 residing merely in fitted parts such as seat 80 and restrictor 110. It will be seen that there is a great community of parts in the two versions of the control device and that a single basic structure may be employed for a control which increases discharge pressure with electrical input or one which decreases it.

It should be apparent to those skilled in the art that the described structures are very compact and suited to mass production, and that they provide a reliable, flexible, and convenient means for supplying fluid under controlled pressure to a clutch or actuated device.

The detailed description of preferred embodiments of the invention is not to be considered as limiting or restricting the invention, as many modifications may be made by the exercise of skill in the art.

I claim:

1. A system for supplying an actuating fluid to an operated device and maintaining the supplied fluid at a variably controllable pressure comprising, in combination, a source of fluid under pressure; externally controllable pilot valve means supplied from the source and effective to provide pilot fluid at a pressure varying substantially solely as a function of the external control input to the pilot valve means; an outlet line for delivering the fluid to the operated device; constantly open variable area throttling valve means connecting the source to the outlet line for flow from the source to the outlet line; by-pass valve means connecting the outlet line to a drain line; actuating means for each valve means responsive to pilot fluid pressure and outlet line pressure acting in opposition on the valve means, the throttling valve means being biased toward closing by outlet line pressure and the by-pass valve means being biased to open by outlet line pressure.

2. A system for supplying fluid under a variably controlled pressure comprising, in combination, means including an input line for supplying fluid at a substantially constant pressure; a pilot fluid line; regulating means responsive to a control input, pressure of the pilot fluid, and pressure in the input line effective to modulate pilot fluid pressure substantially solely as a function of the control input; an output line for connection to a fluid-using device; a flow control valve operative to throttle flow from the input line to the output line, the flow control valve including a valve member movable between a full flow position and a partially open minimum flow position, the flow control valve including means responsive to the pressure difference between the pilot line and the output line biasing the valve member toward the full flow position and means constantly biasing the valve member toward the minimum flow position; and a by-pass valve operative to bleed the output line, the by-pass valve including means responsive to the pressures in the output line and pilot line effective to open the valve when output line pressure exceeds pilot line pressure, thus maintaining output line pressure substantially equal to pilot line pressure and controlling output line pressure as a function of the control input.

* * * * *